US011057523B1

(12) United States Patent
Philip et al.

(10) Patent No.: US 11,057,523 B1
(45) Date of Patent: Jul. 6, 2021

(54) SYSTEMS AND METHODS FOR ROUTING INCOMING CALLS TO OPERATOR DEVICES BASED ON PERFORMANCE ANALYTICS

(71) Applicant: CaaStle, Inc., New York, NY (US)

(72) Inventors: Benny Philip, New York, NY (US); Chirag Jain, New York, NY (US)

(73) Assignee: CaaStle, Inc., New York, NY (US)

( * ) Notice: Subject to any disclaimer, the term of this patent is extended or adjusted under 35 U.S.C. 154(b) by 0 days.

(21) Appl. No.: 16/818,224

(22) Filed: Mar. 13, 2020

(51) Int. Cl.
*H04M 3/00* (2006.01)
*H04M 5/00* (2006.01)
*H04L 12/66* (2006.01)
*H04M 3/523* (2006.01)
*H04M 3/51* (2006.01)

(52) U.S. Cl.
CPC ....... *H04M 3/5233* (2013.01); *H04M 3/5175* (2013.01); *H04M 3/5237* (2013.01); *H04M 2201/42* (2013.01)

(58) Field of Classification Search
CPC ............. H04M 3/5175; H04M 3/5233; H04M 2203/402; H04M 3/5232; H04M 3/5191; H04M 3/5183; H04M 3/523; H04M 3/5238; H04M 3/5235; H04M 2203/408; H04M 3/42068; H04M 2203/401; H04M 3/5141; H04M 3/42059; H04M 3/5166; H04M 2203/158; H04M 2203/556; H04M 3/5125; H04M 3/42042; H04L 67/10; H04L 67/02; H04L 29/0809; H04L 51/02; H04L 63/0876; H04L 41/5064; G06Q 30/016; G06Q 30/01; G06Q 10/00; G06Q 30/012; G06Q 30/0635; G06Q 10/06393; G06Q 10/063112; G06Q 10/06398; G06Q 30/0603
USPC ............ 379/265.09, 265.12, 265.06, 265.11, 379/266.01, 265.02, 265.05, 266.02; 705/304, 14.66, 26.1, 7.14; 370/352, 353
See application file for complete search history.

(56) References Cited

U.S. PATENT DOCUMENTS

| | | | |
|---|---|---|---|
| 10,341,485 B1 * | 7/2019 | Patel | H04L 65/1003 |
| 2005/0043986 A1 * | 2/2005 | McConnell | H04M 3/5232 379/265.02 |
| 2005/0071223 A1 * | 3/2005 | Jain | G06Q 30/0235 705/14.13 |
| 2005/0135593 A1 * | 6/2005 | Becerra | H04M 3/5166 379/220.01 |
| 2007/0112953 A1 * | 5/2007 | Barnett | G06F 21/606 709/224 |

(Continued)

*Primary Examiner* — Ahmad F. Matar
*Assistant Examiner* — Kharye Pope
(74) *Attorney, Agent, or Firm* — Bookoff McAndrews, PLLC

(57) ABSTRACT

Disclosed are systems and methods for routing inbound communications at call centers in order to enhance customer experience and call center agent efficiency. In order to effectively route communications, customer service call types and one or more agent performance rates responding to said customer service calls are analyzed in order to determine which one or more call center agents should be routed which specific customer service call type. Additionally, tools are disclosed for analyzing call center agent performance rates and assigning call center agents to service specific customer service call types.

20 Claims, 6 Drawing Sheets

(56) References Cited

U.S. PATENT DOCUMENTS

| | | | |
|---|---|---|---|
| 2012/0158465 A1* | 6/2012 | Golembiewski | ............................ G06Q 10/06393 705/7.42 |
| 2013/0060587 A1* | 3/2013 | Bayrak | .................. G06Q 10/10 705/7.11 |
| 2013/0236002 A1* | 9/2013 | Jennings | .......... G06Q 10/06393 379/265.12 |
| 2014/0341370 A1* | 11/2014 | Li | ........................ H04M 3/5232 379/265.14 |
| 2015/0213506 A1* | 7/2015 | Parikh | ................. G06Q 30/0269 705/14.66 |
| 2015/0381807 A1* | 12/2015 | Konig | ............ G06Q 10/063112 379/265.06 |
| 2016/0189164 A1* | 6/2016 | Tolksdorf | ............. G06Q 30/016 705/304 |
| 2016/0295019 A1* | 10/2016 | O'Connor | ........... H04M 3/5233 |
| 2017/0111509 A1* | 4/2017 | McGann | ............. H04M 3/5232 |
| 2017/0235436 A1* | 8/2017 | Hooton | ................. G06F 3/0486 705/7.11 |
| 2018/0034965 A1* | 2/2018 | te Booij | .............. H04M 3/5232 |
| 2019/0268475 A1* | 8/2019 | Moran | .................... H04L 41/04 |

* cited by examiner

| HOME |
|---|
| SECURITY |
| GROUPS |
| AGENTS |
| QUEUES |
| CHANNELS |
| SCRIPTS |
| CRM |
| SUPPORT CENTER |
| OUTBOUND SETUP |
| CAMPAIGNS |
| BROADCAST |
| INTEGRATION |
| STATUS CODES |
| TRANSACTION CODES |
| OUTBOUND PHONE CODES |
| WALLBOARD |
| CHAT DESIGN |

AGENT >> EDIT AGENT >> QUEUES　　　302

(JOHN) JOHN JONES

▼ BACK TO AGENT LIST

| GENERAL | PHONE | QUEUES | SUPERVISOR | CRM & TAB PERMISSIONS | INTERACTIONS | EXPERIMENTAL FEATURES |

QUEUE LIST　　　　　　　　　　　　　　　　　　　　　　　　　▼ FILTER QUEUE LIST

☐ ASSIGN ALL　☐ ENABLE ALL　<< < 1 ▼ > >>　20 RECORDS　☑ CONFIGURE SORT　⟲ CLEAR ALL SORT

| MEDIA ▲ | QUEUE NAME | SKILL LEVEL (CLICK TO CHANGE) | AGENTS ENABLED | ASSIGNED | ENABLED |
|---|---|---|---|---|---|
| OUTBOUND PHONE | OUTBOUND CALLING | 20 - LOW | 10 | ☑ | ☑ |
| OUTBOUND PHONE | TEST CAMPAIGN | 80 - HIGH | 3 | ☐ | ☐ |
| INBOUND PHONE | TRAINING GUEST | 80 - HIGH | 4 | ☐ | ☐ |
| INBOUND PHONE | TRAINING SUBSCRIBER | 80 - HIGH | 3 | ☐ | ☐ |
| INBOUND PHONE | TRAINING SHOP | 80 - HIGH | 2 | ☐ | ☐ |
| INBOUND PHONE | SUB CANCEL | 50 - MEDIUM | 15 | ☑ | ☑ |
| INBOUND PHONE | TRAINING SUB RETURN | 80 - HIGH | 2 | ☐ | ☐ |
| INBOUND PHONE | TRAINING SUB SHIPMENT | 80 - HIGH | 2 | ☐ | ☐ |
| INBOUND PHONE | SUB OTHER | 80 - HIGH | 18 | ☑ | ☑ |
| INBOUND PHONE | GUEST HELP | 20 - LOW | 17 | ☑ | ☑ |
| INBOUND PHONE | SHOP HELP | 20 - LOW | 15 | ☑ | ☑ |
| INBOUND PHONE | TRAINING CALL TO CANCEL | 80 - HIGH | 0 | ☐ | ☐ |

NOTE:
- ON SAVE, SKILL LEVEL AND ENABLED WILL BE RESET TO HIGH AND FALSE RESPECTIVELY, FOR ALL UNASSIGNED QUEUES

[ SAVE ] [ CANCEL ]

Table 402

| EMAIL ID | W-1 TOTAL CALL | W-1 POSTPONE | W-1 POSTPONE% | W-2 TOTAL CALL | W-2 POSTPONE | W-2 POSTPONE% | W-3 TOTAL CALL | W-3 POSTPONE | W-3 POSTPONE% |
|---|---|---|---|---|---|---|---|---|---|
| AGENT1@CAASTLE.COM | 27 | 7 | 25.90% | 16 | 5 | 31.30% | 20 | 5 | 25.00% |
| AGENT2@CAASTLE.COM | 2 | 2 | 100.00% | 1 | 1 | 100.00% | | | |
| AGENT3@CAASTLE.COM | 51 | 17 | 33.30% | 103 | 33 | 32.00% | 104 | 37 | 35.60% |
| AGENT4@CAASTLE.COM | 89 | 40 | 44.90% | 97 | 43 | 44.30% | 114 | 32 | 28.10% |
| AGENT5@CAASTLE.COM | | | | 1 | 1 | 100.00% | 1 | 1 | 100.00% |
| AGENT6@CAASTLE.COM | 38 | 19 | 50.00% | 37 | 12 | 32.40% | 42 | 12 | 28.60% |
| AGENT7@CAASTLE.COM | 2 | | | 2 | 2 | 100.00% | 5 | 2 | 40.00% |
| AGENT8@CAASTLE.COM | | | | 48 | 18 | 37.50% | 111 | 28 | 25.20% |
| AGENT9@CAASTLE.COM | 51 | 15 | 29.40% | 67 | 23 | 34.30% | 65 | 18 | 27.70% |
| AGENT10@CAASTLE.COM | 102 | 40 | 39.20% | 134 | 62 | 46.30% | 95 | 38 | 40.00% |
| AGENT11@CAASTLE.COM | 48 | 15 | 31.30% | 17 | 4 | 23.50% | | | |
| AGENT12@CAASTLE.COM | | | | | | | 1 | 1 | 100.00% |
| AGENT13@CAASTLE.COM | | | | | | | | | |
| AGENT14@CAASTLE.COM | 86 | 35 | 40.70% | 96 | 39 | 40.60% | 39 | 15 | 38.50% |

Weight Distribution 404

| W-1 | W-2 | W-3 |
|---|---|---|
| 0.5 | 0.3 | 0.2 |

406

| H | M | L |
|---|---|---|
| ABOVE 35% | BETWEEN 30%–35% | BELOW 30% |

Table 408

| EMAIL ID | W-1 | W-2 | W-3 | WEIGHTED% | H/M/L |
|---|---|---|---|---|---|
| AGENT1@CAASTLE.COM | 43.90% | 38.70% | 33.30% | 40.22% | H |
| AGENT2@CAASTLE.COM | 33.30% | 32.00% | 35.60% | 33.37% | M |
| AGENT3@CAASTLE.COM | 39.20% | 46.30% | 40.00% | 41.49% | H |
| AGENT4@CAASTLE.COM | 44.90% | 44.30% | 28.10% | 41.36% | H |
| AGENT5@CAASTLE.COM | 40.70% | 40.60% | 38.50% | 40.23% | H |
| AGENT6@CAASTLE.COM | 29.40% | 34.30% | 27.70% | 30.53% | M |
| AGENT7@CAASTLE.COM | 25.90% | 31.30% | 25.00% | 27.34% | L |
| AGENT8@CAASTLE.COM | 0.00% | 37.50% | 25.20% | 31.35% | M |
| AGENT9@CAASTLE.COM | 38.30% | 33.30% | 35.80% | 36.30% | H |
| AGENT10@CAASTLE.COM | 50.00% | 32.40% | 28.60% | 40.44% | H |
| AGENT11@CAASTLE.COM | 24.10% | 37.60% | 37.30% | 30.79% | M |
| AGENT12@CAASTLE.COM | 28.40% | 37.50% | 30.60% | 31.57% | M |

FIG. 4

SYSTEMS AND METHODS FOR ROUTING INCOMING CALLS TO OPERATOR DEVICES BASED ON PERFORMANCE ANALYTICS

TECHNICAL FIELD

Various embodiments of the present disclosure generally relate to routing telecommunications and, more particularly, to routing inbound communications among operator devices at call centers in order to enhance customer experience and call center agent efficiency.

BACKGROUND

Call centers and customer service departments often struggle with the problem of optimal resourcing based on workload demand while also adhering to service level agreements reached with business partners. Specifically, operators and managers of call centers have difficulty scheduling and assigning operators for customer outreach and fielding of incoming calls via one or more communication channels in a way that maximizes business objectives. To improve this deficiency, call centers and customer service departments desire accurate data regarding incoming calls, as well as insight into the needs and types of customers that are being communicated with. Even with this level of data, it can be difficult to properly staff a call center and to route incoming calls to those staffed operators in a way that maximizes the objectives of the business.

Once significant objective of many call centers, regardless of industry, is the ability to satisfy a customer so that a customer who might otherwise have been calling to cancel a subscription, return a product, cancel a reservation, or the like. Customers saved from cancellation or returns have a direct impact on retention rate metrics, sales, and hence revenue. Retaining customers, postponing customer cancellations, and ultimately satisfying customers' needs can be particularly challenging in a multi-tenant environment in which a call center serves a variety of different brands, products, marketing channels, etc. (so called "tenants").

Call centers employ various conventional techniques for routing calls to call center agents. For example, many call centers route an incoming call to the first call center agent that is available to receive the call. Another commonly used tool, for example, is to use an automated operator that allows customers to indicate a type of need they have before the call is routed to the correct department/agent. However, routing customers to the first available agent and/or using an automated operator as the first (or potentially only) point of contact are ineffective techniques for satisfying customers and postponing customer cancellations.

Thus, there is a need for systems and methods that maximize call center agent save rate by analyzing call center agent performant on a per tenant (i.e., brand, business partner/customer, channel) basis. Moreover, there is a need for an approach that utilizes additional metrics and tools to overcome some of the challenges described above.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for routing incoming calls to operator devices based on performance analytics to overcome the problems with conventional methods noted above.

In one embodiment, a computer-implemented method for intelligent inbound communication routing comprising: receiving call data generated from a call center, the call data the comprising attributes and results of phone calls to a plurality of agents associated with agent IDs over a period of time; evaluating the received call data to calculate a plurality of agent call performance rates, each agent call performance rate calculated for each agent ID for each of a plurality of intervals within the period of time; applying a weighting factor to each calculated agent call performance rate, such that a higher weight is assigned to more recent intervals of the period time and a lower weight is assigned to less recent intervals of the period time; generating a total agent call performance score for each of the plurality of agents based on the weighted agent call performance rates for that agent; categorizing, via the graphical user interface, each agent of the plurality of agents into a category based on the generated total agent call performance score of each respective agent; and assigning new calls incoming to the call center to one or more of the agents based on the category into which each agent is categorized and an attribute of the respective incoming call.

In one embodiment, a system for intelligent inbound communication routing comprising: a storage device that stores a set of instructions; and at least one processor coupled to the storage device, the set of instructions configuring the at least one processor for: receiving call data generated from a call center, the call data the comprising attributes and results of phone calls to a plurality of agents associated with agent IDs over a period of time; evaluating the received call data to calculate a plurality of agent call performance rates, each agent call performance rate calculated for each agent ID for each of a plurality of intervals within the period of time; applying a weighting factor to each calculated agent call performance rate, such that a higher weight is assigned to more recent intervals of the period time and a lower weight is assigned to less recent intervals of the period time; generating a total agent call performance score for each of the plurality of agents based on the weighted agent call performance rates for that agent; categorizing, via the graphical user interface, each agent of the plurality of agents into a category based on the generated total agent call performance score of each respective agent; and assigning new calls incoming to the call center to one or more of the agents based on the category into which each agent is categorized and an attribute of the respective incoming call.

In one embodiment, a non-transitory computer-readable medium storing instructions for intelligent inbound communication routing comprising: a storage device that stores a set of instructions; and at least one processor coupled to the storage device, the set of instructions configuring the at least one processor for: receiving call data generated from a call center, the call data the comprising attributes and results of phone calls to a plurality of agents associated with agent IDs over a period of time; evaluating the received call data to calculate a plurality of agent call performance rates, each agent call performance rate calculated for each agent ID for each of a plurality of intervals within the period of time; applying a weighting factor to each calculated agent call performance rate, such that a higher weight is assigned to more recent intervals of the period time and a lower weight is assigned to less recent intervals of the period time; generating a total agent call performance score for each of the plurality of agents based on the weighted agent call performance rates for that agent; categorizing, via the graphical user interface, each agent of the plurality of agents into a category based on the generated total agent call performance score of each respective agent; and assigning new calls incoming to the call center to one or more of the agents based on the category into which each agent is categorized and an attribute of the respective incoming call.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3A depicts an exemplary dashboard including a graphical user interface for intelligent routing of inbound communications, according to some embodiments.

FIG. 3B depicts an exemplary dashboard including a graphical user interface for intelligent routing of inbound communications and prioritizing one or more specific call center agents for receiving certain type of inbound communication based on their priority and the type of call, according to some embodiments.

FIG. 4 depicts an exemplary dashboard including a graphical user interface for intelligent routing of specific types of inbound communications to specific call center agents by analyzing call center agent performance and assigning a priority to each specific call center agent based on their priority, according to some embodiments.

DETAILED DESCRIPTION OF EMBODIMENTS

Figure 1:
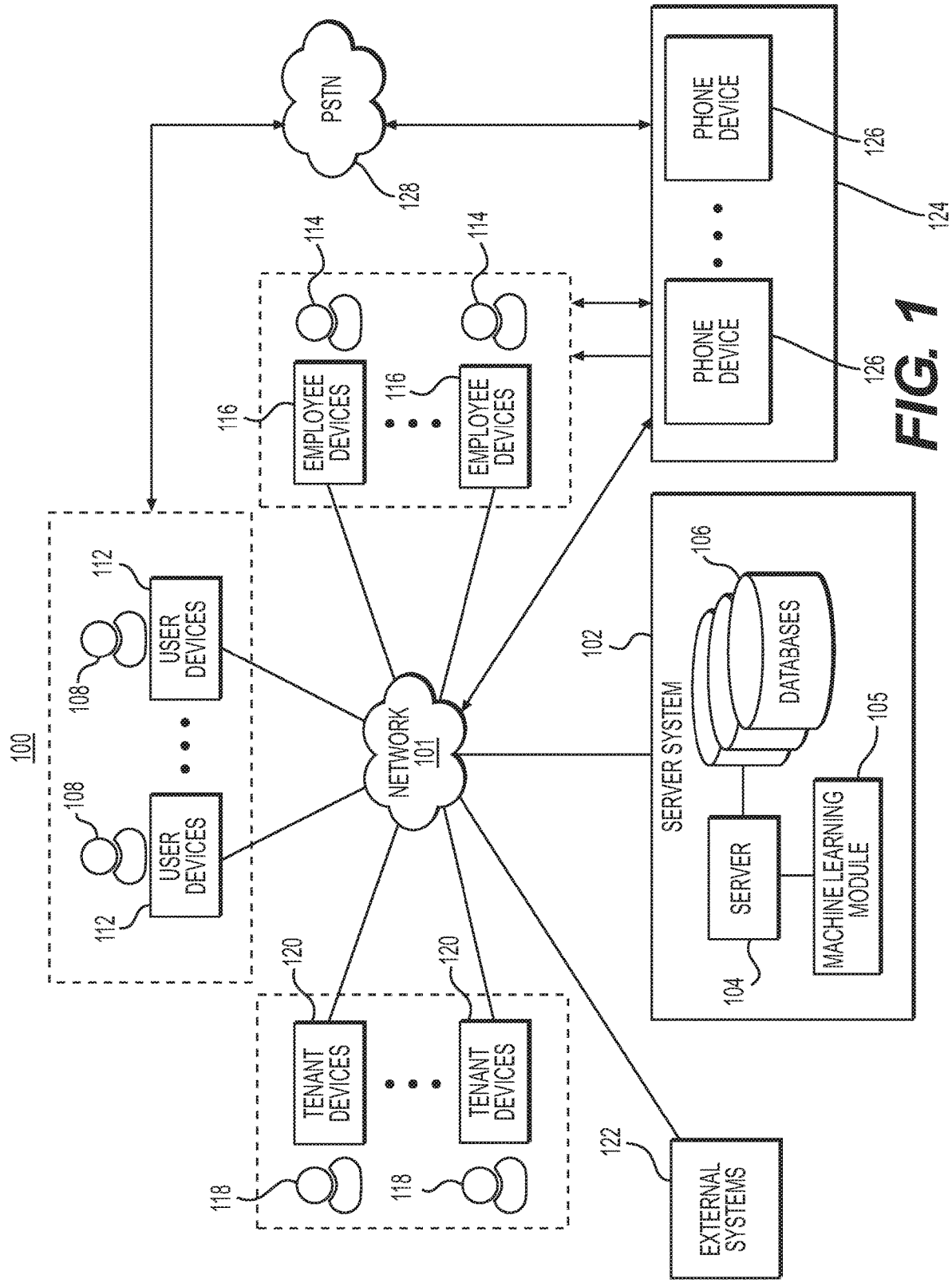
FIG. 1 depicts an example environment in which methods, systems, and other aspects of the present disclosure may be implemented.

As will be described further herein, there is a need for intelligent call routing to specific call center agents based on the type and/or purpose of the inbound call, and each specific call center agent's performance as it pertains to efficiently and successfully servicing customers associated with each specific type of call. Therefore, the present disclosure describes an intelligent call routing systems and methods. In particular, the embodiments disclosed herein provide processes for analyzing call center agent performance, routing inbound communications to agents based on at least call type/purpose and/or tenant identity, and tools for manipulating and editing parameters associated with intelligently routing inbound calls.

As described above, call centers often provide telecommunication services for a plurality of business customers/partners, hereinafter referred to in some cases as "tenants." In the embodiment in which a call center is associated with a clothing subscription platform, a "tenant" may be a third-party clothing brand or retailer for which the clothing subscription platform provides the back office services, warehousing, shipping, logistics, web/mobile applications, etc. Providing telecommunication services for such tenants or other business customers often entails responding to communications from consumers that may be subscribers or customers of tenants according to quality and metric guidelines agreed upon in a service level agreement (SLA). Additionally, one of the primary objectives of a call center is to service inbound cancellation communications from customers. In a call center environment, call management software can be utilized to prioritize call center agents to receive inbound communication based on agent performance, for example each agent's ability to postpone a customer from cancelling. As such, the foregoing application discloses software-implemented methods for intelligently routing calls to agents in order to meet call center agent objectives.

Accordingly, the embodiments disclosed herein may be applied to technological environments and interactions between a call center system, call center employees, tenant systems, and tenant customer devices. That said, while the exemplary system architecture as described in the present disclosure relates to a call center system and call center dashboard for forecasting tenant customer telecommunication volume, various methods and implementations disclosed herein may effectively serve systems and ancillary methods for managing, subscribing to, purchasing, or renting wearable items (e.g., clothing-as-a-service (CaaS) or Try-Then-Buy (TTB) service), or other online transaction platforms in the context of any other subscription, purchase, rental, or retail services without departing from the scope of the disclosure.

As used in the present disclosure, the term "CaaS" (i.e., clothing-as-a-service) may collectively refer to computer-implemented services and functions associated with subscription, purchase, and/or rental services for users (e.g., periodic subscription for receiving wearable items, apparel rental or purchase order, distribution, return processing, TTB services, account management, marketing, customer service, warehouse operations, etc.). As used in the present disclosure, the term "wearable item" may refer to any article of clothing, apparel, jewelry, hat, wearable electronics, smart clothing, accessories, or other product which may be worn by a person, an animal, or a thing, or be used as an ornament for a person, an animal, or a thing.

In accordance with the present disclosure, user interfaces, periodically executed computer-implemented services, ad hoc services, and automations being integrated together in a connected platform may be achieved by a uniquely configured system architecture, job execution cluster configuring one or more processors to perform both storefront and back office tasks, and various user interfaces providing specialized or customized access to users of different roles. The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an example environment 100, according to one or more embodiments of the present disclosure. As shown, the example environment 100 may include one or more networks 101 that interconnect a server system 102, user devices 112, employees 114 or employee devices 116, tenant devices 120, external systems 122, call center(s) 124, and Public Switched Telephone Network (PSTN) 128. The one or more networks 101 and/or PSTN 128 may together or separately include, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users (e.g. tenant customers) 108, employee devices 116 may be accessed by authorized employees (e.g. call center employees) 114, and tenant devices 120 may be accessed by employees of tenant entities 118. In some implementations, employee devices 116 may be used to perform the functions of the tenant devices 120 and/or the user devices 112. Server system 102 may comprise one or more servers 104 and one or more databases 106, which may be configured to store and/or process a plurality of data, microservices, and service components, and/or associated functions thereof.

Users 108 may access the server system 102 through the one or more networks 101 using user devices 112. Each device among the user devices 112 may be any type of computing device (e.g., personal computing device, mobile computing devices, etc.) which allows users 108 to display a web browser or an application for accessing the server system 102 through the network 101. The user devices 112 may, for example, be configured to display a web browser, a web based application, or any other user interface (e.g., one or more mobile applications) for allowing users 108 to exchange information with other device(s) or system(s) in the environment 100 over the one or more networks 101. For example, a device among the user devices 110 may load an application with a graphical user interface (GUI), and the application may display on the GUI one or more apparel recommendations for closeting by the user. Users 108 accessing user devices 112 may be, for example, users and/or potential users of apparel made available for subscription based distribution via electronic transactions and physical shipment. Additionally, or alternatively, users 108 may use user devices 112 to communicate with phone devices 126 of call center 124 to manage one or more user accounts, cancel a subscription, create a new account, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features, such as a closet assistant, size advisor, perform personalized discovery, and/or make recommendations. It should be appreciated that users 108 may alternatively or additionally perform any of these tasks by accessing server system 102, whether via network 101 or PSTN 128 with their user devices 112.

Employee devices 116 may be configured to be accessed by one or more employees 114, including, for example, customer service employees, call center managers, call center employees, marketer employees, warehouse employees, analytics employees, or any other employees who are authorized and/or authenticated to perform tasks, operations, and/or transactions associated with the server system 102, external systems 122, and/or the call center 124. Employee devices 116 may be the same as or different from phone devices 126 of call center 124. In one embodiment, employee devices 116 are owned and operated by the same entity or at least an affiliate of the entity operating the e-commerce (e.g., CaaS) business hosted on server systems 102. Each device among the employee devices 116 may be any type of computing device (e.g., personal computing device, mobile computing devices, etc.). The employee devices 116 may allow employees 114 to view a web browser or an application for accessing the server system 102 and/or the external systems 122, through the one or more networks 101. For example, a device among the one or more of the employee devices 116 may load an application with graphical user interface (GUI) (e.g. a call center dashboard), and the application may display on the GUI one or more call center operations associated with providing CaaS to users 108. In some implementations, the employee devices 116 may communicate directly with the server system 102 and call center 124 via a communications link bypassing public networks 101. Additionally, or alternatively, the employee devices 116 may communicate with the server system 102 via network 101 (e.g., access by web browsers or applications).

Tenant devices 120 may be configured to be accessed by one or more tenants 118. Each device among the tenant devices 120 may be any type of computing device (e.g., personal computing device, mobile computing devices, etc.). As used herein, each tenant, among one or more tenants 118, may refer to an entity that allocates and/or supplies one or more specific collections of apparel for the CaaS inventory. For example, each of the one or more tenants 118 may be a retailer, a designer, a manufacturer, a merchandiser, or a brand owner entity that supplies one or more collections of wearable items to the CaaS inventory managed and/or accessed by the server system 102. Tenants 118 may use one or more electronic tenant interfaces (e.g., a customer management system associated with each tenant) to provide the server system 102 or call center 124 with tenant customer data (e.g., number of subscribers, subscriber call data, subscriber account information) that may transmitted to and/or stored on server system 102. For example, tenant data for each of the one or more tenants 118 may be generated and/or updated at the server system 102 or call center 124 dynamically and/or periodically. Tenant devices 120 may serve as access terminals for the tenants 118, for communicating with the electronic tenant interfaces and/or other subsystems hosted at the server system 102. The tenant devices 120 may, for example, be configured to display a dashboard, a web browser, an application, or any other user interface for allowing tenants 118 to load the electronic tenant interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101.

Call center 124 may be one or more physical buildings or virtual (remote) networks of telephony systems including, for example, one or more servers, routers, switches, telephony components, phone devices 126 (which may comprise of various call center technology, such as: predictive dialer, a VOIP system, a data handler, etc.), and/or dashboards, that integrate with or provide functionality and telephony services to the employee devices 116. Call center 124 may be in communication with other device(s) or system(s) in the environment 100 over the one or more networks 101. For example, call center 124 may communicate with the server system 102 via API (application programming interface) access and/or one or more internet protocols, over the one or more networks 101, and also communicate with the employee devices 116 via a dashboard, and/or internet protocols, over the one or more networks 101.

Public Switched Telephone Network (PSTN) 128 may be, for example, one or more servers, routers, switches, telephony components, customer premises equipment (CPE) (e.g., routers, switches, real property gateways, set-top boxes, fixed mobile convergence products, networking adapters and Internet access gateways), switching equipment (e.g. authentication nodes, call control/switching nodes, charging nodes), and call switching components. PSTN 128 may be in communication with other device(s) or system(s) in the environment 100 over the one or more networks 101. For example, PSTN 128 may communicate with call center 124 via one or more telephony protocols. PSTN 128 may communicate with server system 102 via API (application programming interface) access and/or one or more telephony or internet protocols, over the one or more networks 101, and also communicate with the employee devices 116 and tenant devices 120 via a dashboard, and/or internet protocols, over the one or more networks 101. As indicated above, FIG. 1 is provided merely as an example. Other examples that differ from the example environment 100 of FIG. 1 are contemplated within the scope of the present embodiments. In addition, the number and arrangement of devices and networks shown in environment 100 are provided as an example. In practice, there may be additional devices, fewer devices and/or networks, different devices and/or networks, or differently arranged devices and/or networks than those shown in environment 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 120, in addition to their own functions.

Figure 2:
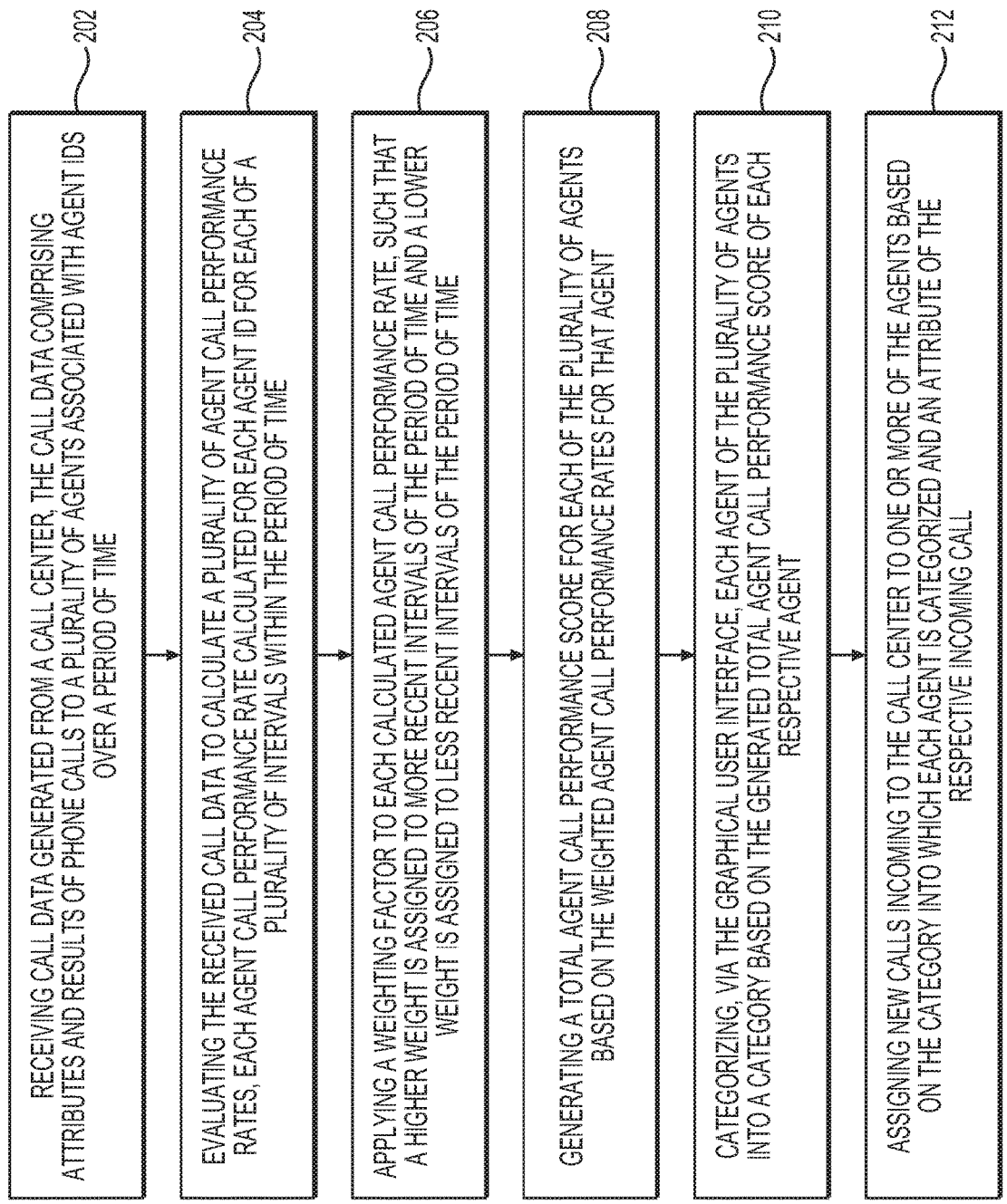
FIG. 2 depicts an exemplary high-level process for routing incoming calls to operator devices based on performance analytics, according to some embodiments.

FIG. 2 depicts an exemplary process 200 for intelligent call routing, according to some embodiments. Although the following steps may be performed in a different order, in an exemplary embodiment, one or more systems in environment 100 may initiate the process 200 for receiving call data generated from a call center, the call data the comprising attributes and results of phone calls to a plurality of agents associated with agent IDs over a period of time (Step 202). For example, one or more agents 114 operating a dashboard in communication with server system 102 and/or call center 124 may initiate a request to receive call data (e.g. total call volume, a number of retained subscribers (i.e., the number of subscribers that maintain their subscription), agent ID associated with each call/call type, etc.) for each agent 114 over a specific window of time (e.g., three weeks, three months, one year, etc.).

One or more systems (e.g. server system 102 and/or call center 124) in environment 100 may then implement a step for evaluating the received call data to calculate a plurality of agent call performance rates, each agent call performance rate calculated for each agent ID for each of a plurality of intervals within the period of time (Step 204). For example, an algorithm implemented by the server system 102 and/or call center 124 may analyze the number or received calls, the type of calls (i.e., customer/subscriber cancellation calls, purchase cancellation call, membership termination, etc.), agent performance rate (e.g., an agent 114 "save rate" associated with satisfying customers during customer/subscriber cancellation calls) on each call/call type, over a specific period of time.

The one or more systems may then implement a step for applying a weighting factor to each calculated agent call performance rate, such that a higher weight is assigned to more recent intervals of the period time and a lower weight is assigned to less recent intervals of the period time (Step 206). For example, server system 102 and/or call center 124 independently or in conjunction may implement an algorithm for applying a weighting factor (e.g., a percentage or ranking, that may be expressed as a numerical value, for example: 0.5, 0.3, 0.2) to the performance rate of each agent 114. In a non-limiting example, a higher weight (e.g., 0.5) is applied to the performance rate of each agent for more recent time periods (e.g., the last week/seven days); whereas a lower weight (e.g., 0.3) is applied to the performance rate of each agent for less recent periods of time (e.g., agent 114 performance rates generated 8-21 days ago).

The one or more systems may then implement a step for generating a total agent call performance score for each of the plurality of agents based on the weighted agent call performance rates for that agent (Step 208). For example, generating a total agent call performance score may at the very least include applying the weighing factor to each respective agent's performance rate in such a way that if the agent 114 had a performance rate of 100 during week one, after applying the weighting factor of 0.5 to the agent's performance rate, the agent's total agent call performance score would be "50." Similarly, if the agent's performance rate associated with week two was 100, then the agent's total agent call performance score would be "30" after applying a weighting factor of 0.3, and so on.

The one or more systems may then implement a step for categorizing, via the graphical user interface, each agent of the plurality of agents into a category based on the generated total agent call performance score of each respective agent (Step 210). Here, for example, each agent's total agent call performance score may be analyzed for each call type (e.g., customer/subscriber cancellation calls vs. order issue calls) in order to rank each agent 114 based on their total agent call performance score. Each agent 114 may then be categorized and assigned a priority for each call type, such that agents 114 that ranked higher for a specific call type will be prioritized to receive calls associated for that specific call type.

The one or more systems may then implement a step for assigning new calls incoming to the call center to one or more of the agents based on the category into which each agent is categorized and an attribute of the respective incoming call (Step 212). Here, calls may then be assigned to the agents 114 that have been prioritized to receive calls for a specific call type. For example, agents 114 that have high total agent call performances scores associated with customers/subscribers calling in to cancel their subscription (e.g., because that agent is able to provide exemplary service such that the customer/subscriber decides to remain a customer) and thus have been prioritized to receive such calls, may be routed inbound communications for customers potentially cancelling their subscription in order leverage the agent's 114 expertise in retaining customers.

FIG. 3A depicts a graphical user interface comprising an exemplary dashboard 203 for intelligent routing inbound communications, according to some embodiments. According to one embodiment, call center dashboard 203 may include an interface for establishing parameters and inputs in order to intelligently route inbound calls to agents 114. Dashboard 302 may be made available to agents 114 in order to provide agents 114 and/or managers with historical data regarding each agent's total agent call performance score. For example, an agent's total agent call performance score for the last, e.g., twenty-one consecutive work days can be analyzed and used at the beginning of each work day or work shift to establish call center 124 priorities (e.g. how agents 114 are prioritized) for that day's work shift via the dashboard.

Dashboard 302 may include several dynamic regions that can be manipulated, selected, filtered, and rearranged. For example, dashboard 302 may include one or more menus that allow agents 114 to select menu items pertaining to: security, agent groups, agents 114, queues, channels, scripts, CRM, support, campaigns, broadcasting, integration, status codes, transaction codes, inbound and outbound phone codes, wallboard, and chat design. Once selected, each menu item may dynamically modify a central presentation region wherein features associated with that menu item may be made available to the user (e.g., agent 114). For example, as depicted in FIG. 3A, if the menu item "agents" is selected, in the central presentation region additional features associated with agents may be displayed. In particular, selecting the agent menu item from the menu may provide features directed to general call management information, phone information, current queue information, supervisor features, permission, and information, CRM (customer relationship management) permissions, past agent 114 engagements and interactions, and experimental dashboard features and tools. The aforementioned features may be selected via tabs in a customizable sub-menu. Once a tab corresponding to a feature is selected, the central presentation region may be reconfigured to provide a user (e.g., an agent 114) with richer insight regarding that feature. For example if a tab pertaining to queues is selected by an agent 114 then the central presentation region may be reconfigured to display information regarding current call metrics (e.g., number of inbound calls, outbound calls, call type, number of agents 114 assigned to each call type, the agent's 114 agent ID, the agent's 114 skill, etc.) and permission option at the very least pertaining to categorizing and prioritizing agents within the call type.

Figure 3B:
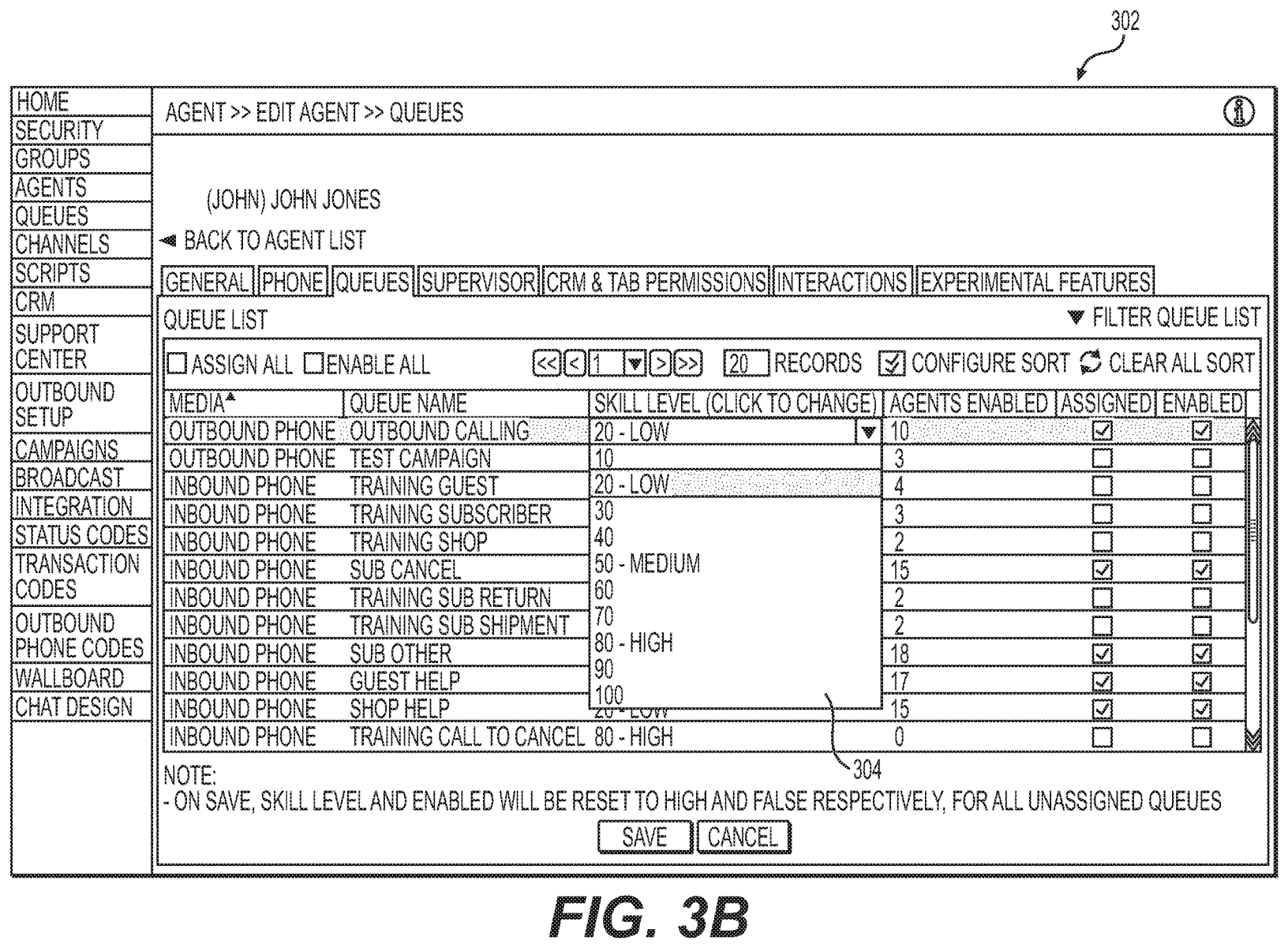

FIG. 3B depicts an exemplary dashboard including a graphical user interface for intelligent routing of inbound communications and prioritizing one or more specific call center agents for receiving certain type of inbound communication based on their priority and the type of call, according to some embodiments. In addition to the dashboard features disclosed in FIG. 3A, FIG. 3B elaborates on the features directed to attributing a skill level to agents 114, assigning agents to a particular call type, and prioritizing agents based on total agent call performance score the agent's 114 assignment within a call type. Dashboard 302 additionally includes features for dynamically modifying permissions, assignments, tables, and filtering options. For example, dynamic tab 304, once selected, is capable of providing presenting sub-menus, displaying options, modifying agent 114 priorities, and assigning agent 114 skill level. For example, if an agent 114 has been determined to have a high total agent call performance score for call cancellations, dynamic tab 304 may provide the functionality for a user (e.g. an agent 114 or manager of the agent 114) to set the skill level associated with the agent 114 to high to ensure that that agent 114 is routed calls related to customers that desire to cancel their subscription.

While previous embodiments discuss manual and semi-autonomous processes for intelligent call routing, call metrics and agent 114 performance rates may be tracked over time by server system 102 and/or call center 124 and leveraged by system 102 and/or call center 124 in order to automatically assign agents 114 to specific call types. In this embodiment, the dynamic features of dashboard 302 would remain available to agents 114 to provide agents 114 with the functionality override system related decisions.

FIG. 4 depicts an exemplary dashboard including a graphical user interface for intelligent routing of specific types of inbound communications to specific call center agents by analyzing call center agent performance and assigning a priority to each specific call center agent based on their priority, according to some embodiments. Dashboard 402 may be communication with server system 102 and call center 124 in order to track agent performance metrics (e.g., total calls taken, postponement rate, and postponement percentage) as a function of time (i.e., over three previous weeks, that is week one, week two, and week three, for example) for each agent 114. For example, dashboard 402 may track each agents' 114 total calls and total postponements (i.e., number of potential cancellations the agent was able to prevent) in order to derive a postponement percentage (i.e., the number of postponements divided by the total number of calls or PP=Tnps/Tnct) for at least three weeks. Dashboard 402 may then apply a weighting factor 404 to the derived postponement percentage. Dashboard 402 may conduct an agent skill level analysis in view of the agent's weighted score (i.e., total agent call performance score) and skill level table 406. Agents 114 whose weighted score exceeds a threshold (e.g., a numeric value associated with being high performer, medium performer, and low performer) are assigned to a specific skill level associated with the threshold that was exceeded. Dashboard may then display each agent's agent ID (e.g., email ID, user name, log-in. etc.), postponement percentage for each week (i.e., week one, week two, and week three), an average weighted percentage (e.g., summing the postponement average for all three weeks for each agent and dividing that total by three), and the skill level the agent has been assigned based on the thresholds in skill level table 406.

Figure 5:
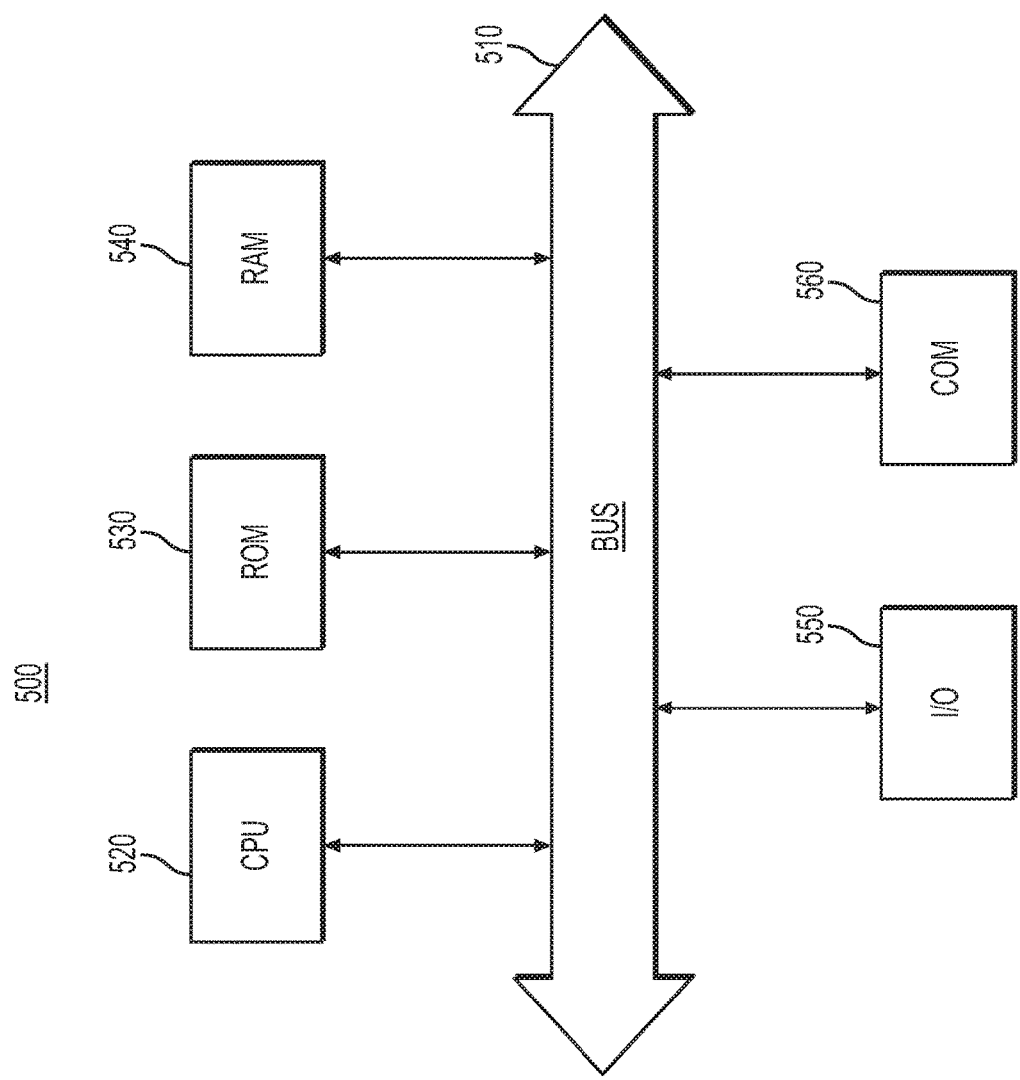
FIG. 5 depicts an exemplary computer device or system, in which embodiments of the present disclosure, or portions thereof, may be implemented.

FIG. 5 depicts an exemplary computer device or system, in which embodiments of the present disclosure, or portions thereof, may be implemented. As shown in FIG. 5, a device 500 used for performing the various embodiments of the present disclosure (e.g., the server system 102, the user devices 112, the employee devices 116, the tenant devices 120, and/or any other computer system or user terminal for performing the various embodiments of the present disclosure) may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multiprocessor system, such system operating alone, or in a cluster of computing devices operating in a cluster or server farm. CPU 520 may be connected to a data communication infrastructure 510, for example, a bus, message queue, network, or multi-core message-passing scheme.

A device 500 (e.g., the server system 102, the user devices 112, the employee devices 116, the tenant devices 120, and/or any other computer system or user terminal for performing the various embodiments of the present disclosure) may also include a main memory 540, for example, random access memory (RAM), and may also include a secondary memory 530. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

A device 500 may also include a communications interface ("COM") 560. Communications interface 560 allows software and data to be transferred between device 700 and external devices. Communications interface 560 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 560. These signals may be provided to communications interface 560 via a communications path of device 800, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. A device 500 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method executed by at least one processor comprising:
    receiving call data generated from a call center, the call data comprising attributes and results of phone calls received over a period of time by a plurality of agents associated with the call center, each agent being associated with an agent ID;
    evaluating the received call data to calculate a plurality of agent call performance rates, each agent call performance rate calculated for each agent ID for each of a plurality of intervals within the period of time, each agent call performance rate being calculated at least in part based on an agent save rate calculated based on subscriber cancellation postponement data for the agent;
    applying a weighting factor, via a processor receiving instructions from a dynamic dashboard, to each calculated agent call performance rate, such that a higher weight is assigned to more recent intervals of the period time and a lower weight is assigned to less recent intervals of the period time;
    generating a weighted agent call performance score for each of the plurality of agents based on the weighted agent call performance rates for that agent;
    categorizing, via the processor receiving instructions from the dynamic dashboard, each agent of the plurality of agents into a performance category based on the generated weighted agent call performance score of each respective agent;
    modifying, via the processor receiving instructions from the dynamic dashboard, the performance category for at least one of the agents based on an adjustment received via the dynamic dashboard; and
    automatically assigning, via the processor receiving instructions from the dynamic dashboard, new calls incoming to the call center to one or more of the agents based on the category into which each agent is categorized and an attribute of the respective incoming call.

2. The computer-implemented method of claim 1, further comprising:
    weighting the agent call performance score for each agent of the plurality of agents for one or more subsets of time during a second period of time via the processor receiving instructions from the dynamic dashboard.

3. The computer-implemented method of claim 1, wherein an agent save rate is calculated as: PP=(Tnps/Tnct).

4. The computer-implemented method of claim 1, wherein weighting the performance score to each agent of the plurality of agents for one or more subsets of time further comprises:
    applying a decay function to the weighting such that a higher weight is assigned to more recent subsets of time during a first period of time and a lower weight is assigned to older subsets of time during the first period of time.

5. The computer-implemented method of claim 1, further comprising reordering graphical elements corresponding to the plurality of agents based on categorization and weighting of the performance score of each respective agent.

6. The computer-implemented method of claim 1, wherein data associated with the agent save rate is received from a system corresponding to a call center and the agent ID corresponding to the plurality of agents is an agent email address.

7. A system comprising:
    a storage device that stores instructions; and
    at least one processor that executes the instructions in order to perform steps of:
    tracking an agent save rate over a first period of time for a plurality of agents;
    associating each tracked agent save rate with an agent performance score for each agent of the plurality of agents respectively, each agent performance score being based at least in part on subscriber cancellation postponement data;
    weighting, via a processor receiving instructions from a dynamic dashboard, the agent performance score for each agent of the plurality of agents for one or more subsets of time during the first period of time via a graphical user interface;
    categorizing, via the processor receiving instructions from the dynamic dashboard, each agent of the plurality of agents based on the performance score of each respective agent into a category from a list comprising: high, medium and low; and
    modifying, via the processor receiving instructions from the dynamic dashboard, the category for at least one of the agents based on an adjustment received via the dynamic dashboard.

8. The system of claim 7, being further configured to perform a method comprising:
    weighting the performance score to each agent of the plurality of agents for one or more subsets of time during a second period of time via the processor receiving instructions from the dynamic dashboard.

9. The system of claim 7, wherein an agent save rate is calculated as: PP=(Tnps/Tnct).

10. The system of claim 7, wherein weighting and assigning the performance score to each agent of the plurality of agents for one or more subsets of time further comprises:
    applying a decay function to the weighting such that a higher weight is assigned to more recent subsets of time during a first period of time and a lower weight is assigned to older subsets of time during the first period of time.

11. The system of claim 7, further comprising reordering graphical elements corresponding to the plurality of agents based on categorization and weighting of the performance score of each respective agent.

12. The system of claim 7, wherein data associated with the agent save rate is received from a system corresponding to a call center.

13. A non-transitory computer-readable medium storing instructions, the instructions configured to cause at least one processor to perform operations comprising:
- tracking an agent save rate over a first period of time for a plurality of agents;
- associating each tracked agent save rate with an agent performance score for each agent of the plurality of agents respectively, each agent performance score being calculated at least in part based on subscriber cancellation postponement data;
- weighting, via the at least one processor receiving instructions from a dynamic dashboard, the performance score for each agent of the plurality of agents for one or more subsets of time during a first period of time via a graphical user interface;
- categorizing, via the at least one processor receiving instructions from the dynamic dashboard, each agent of the plurality of agents based on the performance score of each respective agent into a category from a list comprising: high, medium and low; and
- modifying the category for at least one of the agents based on an adjustment received via the graphical user interface.

14. The non-transitory computer-readable medium of claim 13, further comprising:
- weighting the performance score to each agent of the plurality of agents for one or more subsets of time during a second period of time via the at least one processor receiving instructions from the dynamic dashboard.

15. The non-transitory computer-readable medium of claim 13, wherein an agent save rate is calculated as: $PP=(Tnps/Tnct)$.

16. The non-transitory computer-readable medium of claim 13, wherein weighting the performance score to each agent of the plurality of agents for one or more subsets of time further comprises:
- applying a decay function to the weighting such that a higher weight is assigned to more recent subsets of time during the first period of time and a lower weight is assigned to older subsets of time during the first period of time.

17. The non-transitory computer-readable medium of claim 13, further comprising reordering graphical elements corresponding to the plurality of agents based on categorization and weighting of the performance score of each respective agent.

18. The computer-implemented method of claim 1, wherein the dashboard enables modification of the performance categorization for a particular agent by an interaction with a graphical element that is initiated by a user.

19. The computer-implemented method of claim 1, wherein the weighting factor is applied to limit the weighted agent call performance score to a predetermined window of time.

20. The computer-implemented method of claim 19, wherein the predetermined window of time is a period of weeks, months, or years.

* * * * *